(12) United States Patent
Yeh et al.

(10) Patent No.: US 7,385,184 B2
(45) Date of Patent: Jun. 10, 2008

(54) VOLUME CALIBRATION PHANTOM AND CALIBRATION METHOD THEREOF

(75) Inventors: Chin-Hsien Yeh, Hsinchu (TW); Ming-Chen Yuan, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 0 days.

(21) Appl. No.: 11/550,367

(22) Filed: Oct. 17, 2006

(65) Prior Publication Data

US 2008/0087807 A1 Apr. 17, 2008

(51) Int. Cl.
*G01D 18/00* (2006.01)

(52) U.S. Cl. .................................... 250/252.1

(58) Field of Classification Search ............. 250/252.1; 378/207; 702/85, FOR. 156
See application file for complete search history.

(56) References Cited

U.S. PATENT DOCUMENTS

| | | | | | |
|---|---|---|---|---|---|
| 4,409,480 | A | * | 10/1983 | Givens | 250/252.1 |
| 4,499,375 | A | * | 2/1985 | Jaszczak | 250/252.1 |
| 4,788,701 | A | * | 11/1988 | Barrett | 378/69 |
| 4,865,769 | A | * | 9/1989 | Anayama | 252/478 |
| 5,442,180 | A | * | 8/1995 | Perkins et al. | 250/367 |
| 5,562,593 | A | * | 10/1996 | Sammel | 588/261 |
| 6,293,899 | B1 | * | 9/2001 | Sioshansi et al. | 600/3 |
| 2006/0193421 | A1 | * | 8/2006 | Orr | 376/156 |

* cited by examiner

*Primary Examiner*—Constantine Hannaher
*Assistant Examiner*—Kiho Kim
(74) *Attorney, Agent, or Firm*—WPAT, P.C.; Justin I. King

(57) ABSTRACT

A volume calibration phantom comprises a container; a plurality of plates stacking up inside the container; and at least one slab of radioactive source, each of which is disposed between the adjacent plates and comprises a plurality of radionuclides. With the volume calibration phantoms, the present invention further provides a calibration method which is an improvement over conventional calibration methods of space geometric center point source and relative penetration factor ratios. The method comprises the steps of generating a calibration curve of density vs. counting efficiency corresponding to the several different volume calibration phantoms; calculating the density of a radioactive waste specimen to obtain a corresponding radioactive activity according to the calibration curve, and then revising the corresponding radioactive activity according to the energy dependency and equation of gamma gross radioactivity for multiple radionuclides so as to obtain the correct gamma gross radioactivity of the radioactive waste specimen.

17 Claims, 7 Drawing Sheets

VOLUME CALIBRATION PHANTOM AND CALIBRATION METHOD THEREOF

FIELD OF THE INVENTION

The present invention relates to a volume calibration phantom and calibration method thereof, and more particularly, to a calibration method for calibrating phantoms of various densities, by which a corresponding calibration curve of density against counting efficiency can be obtained and used as reference for obtaining a sample gross gamma radioactivity of a test sample while calibrating the sample gamma gross radioactivity by a calibration formula for acquiring a correct gross gamma radioactivity.

BACKGROUND OF THE INVENTION

Currently, waste curie monitors, being substantially an assembly of several large-area plastic scintillation detectors, are frequently used at nuclear facilities and organizations for measuring the gross gamma radioactivity of very low radioactive wastes. The aforesaid monitors are advantageous in its high radioactive sensitivity, high counting efficiency, short counting interval required for counting a test sample, no restriction to the volume of the waste to be monitored thereby, and capability of revealing the weight of the waste monitored thereby, and so on.

However, the aforesaid monitors still have drawbacks list as following: (1) The radioactivity measured thereby is often overestimated or under-estimated, since it only accounts for the weight of a waste sample tested thereby and overlooks the deviations of various self-absorption effects caused by the various densities of different waste samples. (2) Since the calibration curve used in aforesaid monitors is based upon the measurement of an object made up of a pure substance that it overlooks the fact that any usual waste sample is made up of more than one substance, the so-established calibration curve is not appropriate. (3) For calibrating the aforesaid monitor, phantom is being positioned at the geometric center of the monitor, that is not relative to the positioning of a waste sample on the floor of the aforesaid monitor as it is being measured. (4) As there is no restriction regarding to the volume of a waste sample to be measured by the aforesaid monitor, the distances between the tested sample and the scintillation detectors are not conforming to those of a phantom as being used for building a calibration curve, and thus error in radioactivity measurement will occur so that the accuracy of radioactivity measurement required by Regulation of radiation protection can not be achieved. (5) The corresponding radioactive activity with respect to the energy dependency and equation of gamma gross radioactivity for multiple radionuclides are not revised, so that the gamma gross radioactivity of the radioactive a waste sample measured thereby is not accurate.

In recent years, an improvement over conventional calibration methods of space geometric center point source is being developed for performing gross gamma radioactivity measurement upon waste samples while using the measurement for classifying wastes into radioactive wastes and non-radioactive wastes. Currently, there are several calibration methods for plastic scintillation detectors, which are listed as following: (1) The calibration method developed by Themo-Eberline adopts a means of transmission factor (TF) for calibrating self-absorption effects of various standard mass, in that, the transmission factor is defined as the ratio of the dose inside the shielding material to the outside (ambient) dose, whereas $TF \leq 1.0$ refers to the calibration of non-shield radioactive source positioned in the geometric center of a space filled with air. Moreover, as TF is defined to be 1, the mass of a radioactive material containing in a water phantom can be determined whereas 10 kg is being defined as a unit, and thus, a calibration file corresponding thereto can be established Thereby, the gross gamma radioactivity of a waste sample can be calibrated with respect to the comparison between the weight of the tested waste sample and its standard mass of TF=1; (2) The method, developed by RADOS company, Germany, adopts a pure iron plate assembly for calibrating; (3) The method, developed by Japan Nuclear Energy Safety Organization, adopts an assembly of metal tubes and metal plates for multi-radionuclides calibration; (4) The method, developed by NE Technology company, USA, adopts multi-radionuclides point sources and a pure Brazil wood of density equal to one for performing a multi-weight calibration (0~60 kg). However, those currently available calibration methods only account for general masses and geometrical shapes, they still can not deal with the self-absorption effects of a waste sample of various masses as well as their energy dependency, and thus the gross gamma radioactivity acquired thereby is not accurate.

Therefore, it is in need of a volume calibration phantom and calibration method thereof, which free from the problems of prior arts.

SUMMARY OF THE INVENTION

It is the primary object of the present invention to provide a calibration method for calibrating phantoms of various densities, by which a corresponding calibration curve of density against counting efficiency can be obtained and used as reference for obtaining a sample gross gamma radioactivity of a test sample while calibrating the sample gamma gross radioactivity by a calibration formula for acquiring a correct gross gamma radioactivity.

It is another object of the invention to provide a volume calibration phantom and calibration method thereof, which can be used for evaluating energy dependency so as to use the evaluation for calibrating the gross gamma radioactivity of various waste samples.

Yet, another object of the invention is to provide a volume calibration phantom and calibration method thereof, which use a standard container, whose volume and dimensions are the same as those of the volume calibration phantom, for enabling a waste sample to be tested and measured at a condition similar to that of the volume calibration phantom and thus acquiring an accurate radioactivity corresponding thereto.

To achieve the above objects, the present invention provides a volume calibration phantom, being disposed inside a monitor having a plurality of radiation detectors received inside a accommodation space formed inside the monitor, that the volume calibration phantom is comprised of: a container; a plurality of plates, stacking up inside the container; and at least one slab of radioactive source, each of which is disposed between the adjacent plates and comprises a plurality of radionuclides.

Preferably, each plate is made of a metal such as iron.

Preferably, each plate is made of a non-metal material where as the non-metal material is a material selected from the group consisting of paper, wood, gypsum, acrylic resin, rubber and glass.

Preferably, any one of the plural radionuclides is a gamma radioactive source, and can be a radionuclide selected from the group consisting of $^{57}$Co, $^{54}$Mn, $^{60}$Co, $^{137}$Cs and the combination thereof Preferably, any one of the plural radionuclides is a radioactive source of circular shape, and the diameter of the circular-shaped radioactive source is smaller than 5 cm.

Preferably, each slab of radioactive source is comprised of: a bottom laminating layer; a leakage-prevention filter layer, formed on the bottom laminating layer while having the plural radionuclides to be formed thereon; and a top laminating layer, formed on top of the leakage-prevention filter layer as the protection of the plural radionuclides.

In a preferred aspect, present invention provides a calibration method, comprising steps of: providing a plurality of volume calibration phantoms of various densities; measuring the plural volume calibration phantoms by a specific monitor for obtaining a calibration curve of density against counting efficiency corresponding to the measurement; filling a waste specimen into a container of the same volume as each of the plural volume calibration phantoms so as to be used as a test sample; obtaining a sample gamma gross radioactivity of the test sample by referencing to the calibration curve with respect to the density of the test sample measured and detected by the specific monitor; and calibrating the sample gamma gross radioactivity by a calibration formula for acquiring a correct gamma gross radioactivity.

Preferably, the sample gamma gross radioactivity can be calibrated with respect to an energy dependency factor and a formula of multi-radionuclides calculation.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
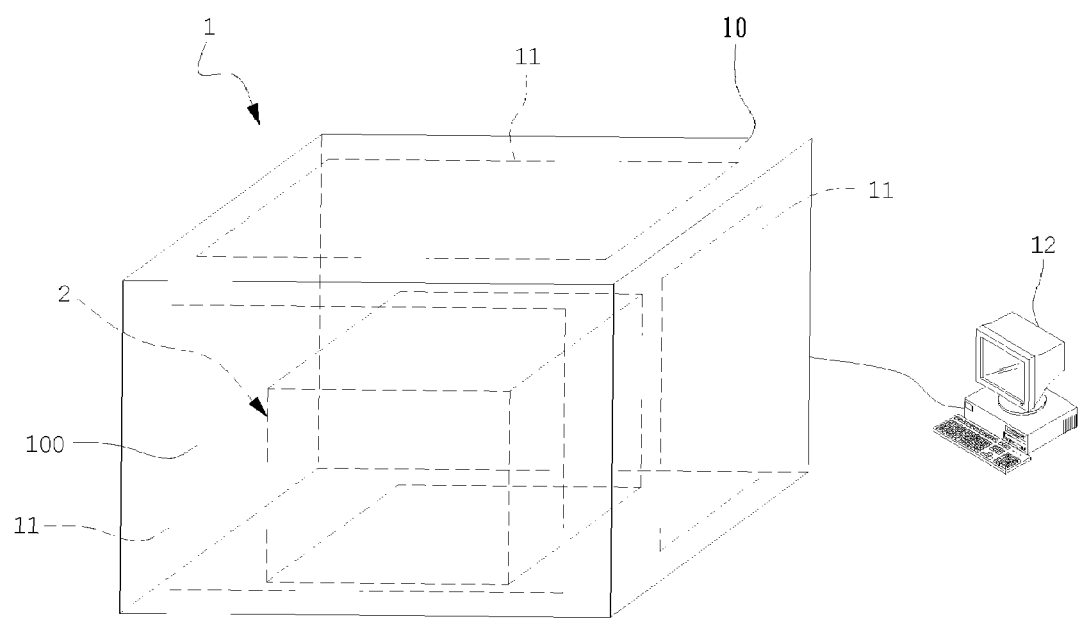
FIG. 1 is a schematic diagram showing a volume calibration phantom and a waste curie monitor.

Please refer to FIG. 1, which is a schematic diagram showing a volume calibration phantom and a waste curie monitor. The waste curie monitor 1 of FIG. 1 is substantially a shield box 10 whose six walls is made of lead with equal thickness, in which an inspection space 100 is formed while having six large-area radiation detectors 11 being arranged respectively on the inner walls of the shield box 10 encasing the inspection space 100. In this preferred embodiment of the invention, each large-area radiation detector 11 can be a plastic scintillation detector. Moreover, a weight meter is disposed in the inspection space 100 for weighting an object-to-be-tested. In addition, the waste curie monitor is connected to a computer 12, which is programmed with a software and calibration parameters for performing operations such as counting the radioactivity (Bq) or specific radioactivity (Bq/g) in a sample and its back ground, calibrating the minimum detectable activity (MDA) of the monitor, and printing and displaying the result of a detection.

Figure 2A:
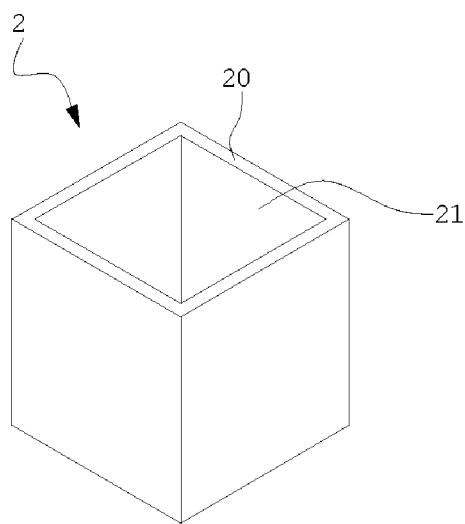
FIG. 2A is a schematic diagram showing a standard container of the invention.
Figure 2B:
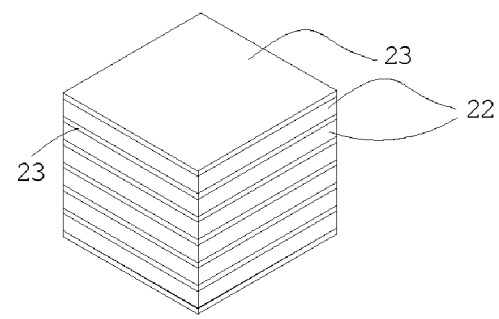
FIG. 2B shows the stacking of pates and slabs of radioactive sources according to the present invention.

As seen in FIG. 1, a volume calibration phantom 2 of uniform radioactivity is received in the inspection space 100. Please refer to FIG. 2A and FIG. 2B, which are schematic diagrams respectively showing a standard container and the stacking of plates and slabs of radioactive sources according to the present invention. The volume calibration phantom 2 is substantially a stacking of uniform plates 22 and slabs of radioactive source 23, being disposed in an inner space 21 of a standard container 20. In a preferred aspect, each plate 21 can be made of a metallic material or a non-metallic material, whereas the metallic material can be iron; and the non-metallic material can be paper, wood, gypsum, acrylic resin, rubber or glass.

In a preferred embodiment of the invention, uniform plates made of seven different materials are being cut into plates of 33 cm wide, 33 cm long and 1 cm thick, and are stacked to form a calibration phantom about the same size as the standard container 20, that is about 33 cm long, 33 cm wide and 30 cm height, while enabling the weight of the calibration phantom to be ranged between 5 kg to 100 kg. The average density of the calibration phantom can be acquired with respect to its volume, i.e. 33 cm$^3$. In a preferred aspect, the calibration phantom is a multi-density calibration phantom, composing of paper plates at a density of 0.15 gcm$^{-3}$, wood plates at a density of 0.55 gcm$^{-3}$, gypsum plates at a density of 0.75 gcm$^{-3}$, acrylic plates at a density of 1.13 gcm$^{-3}$, rubber plates at a density of 1.80 gcm$^{-3}$, glass plate at a density of 2.5 gcm$^{-3}$, and iron plates at a density of 3 gcm$^{-3}$.

Figure 3A:
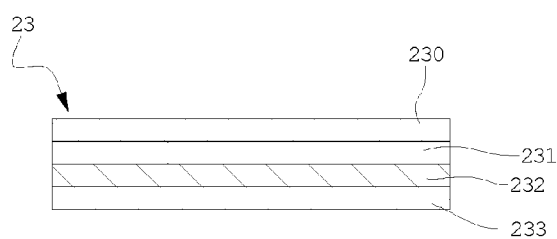
FIG. 3A is cross-sectional view of a slab of radioactive sources according to the present invention.

In the calibration phantom, there are seven large-area slabs of radioactive source being sandwiched respectively between adjacent plates. Please refer to FIG. 3A, which is cross-sectional view of a slab of radioactive sources according to the present invention. As seen in FIG. 3A, each of the large-area slabs of radioactive source 23 is comprised of: a bottom laminating layer 233; a leakage-prevention filter layer 232, formed on the bottom laminating layer 233, a radiation source layer 231 with a plurality of radionuclides, formed on the leakage-prevention filter layer 232; and a top laminating layer 230, formed on top of the leakage-prevention filter layer 232, wherein, by the cooperation of the top and bottom laminating layers 230, 233, the plural radionuclides of the radiation source layer 231 are protected.

Figure 3B:
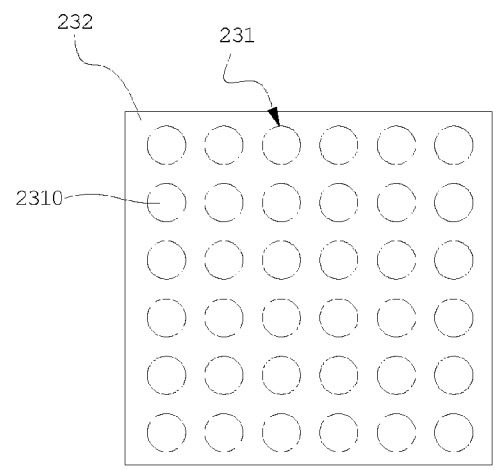
FIG. 3B is a schematic diagram depicting the distribution of radionuclides on a slab of radioactive sources according to the present invention.

Preferably, any one of the plural radionuclides can be a gamma radioactive source, and can be a radionuclide selected from the group consisting of $^{57}$Co, $^{54}$Mn, $^{60}$Co, $^{137}$Cs and the combination thereof. Please refer to FIG. 3B, which is a schematic diagram depicting the distribution of radionuclides on a slab of radioactive sources according to the present invention. In FIG. 3B, a 6×6 matrix is formed on the radiation source layer 231 that a total of 36 drops of 0.2 cc liquid-state radioactive sources 2310 are dripped respectively onto each area of the 6×6 matrix while each drop of the liquid-state radioactive source 2310 is spread into a circle whose diameter is smaller than 5 cm, while the 36 circles are not overlapped with each other. It is noted that the gross radioactivity of large-area slabs of $^{57}$Co, $^{54}$Mn, $^{60}$Co, $^{137}$Cs are respectively 58 kBg, 72 kBg, and 90 kBg. As there are four different energies and seven different densities, 28 calibration phantoms of different energy and different densities can be established.

Figure 4:
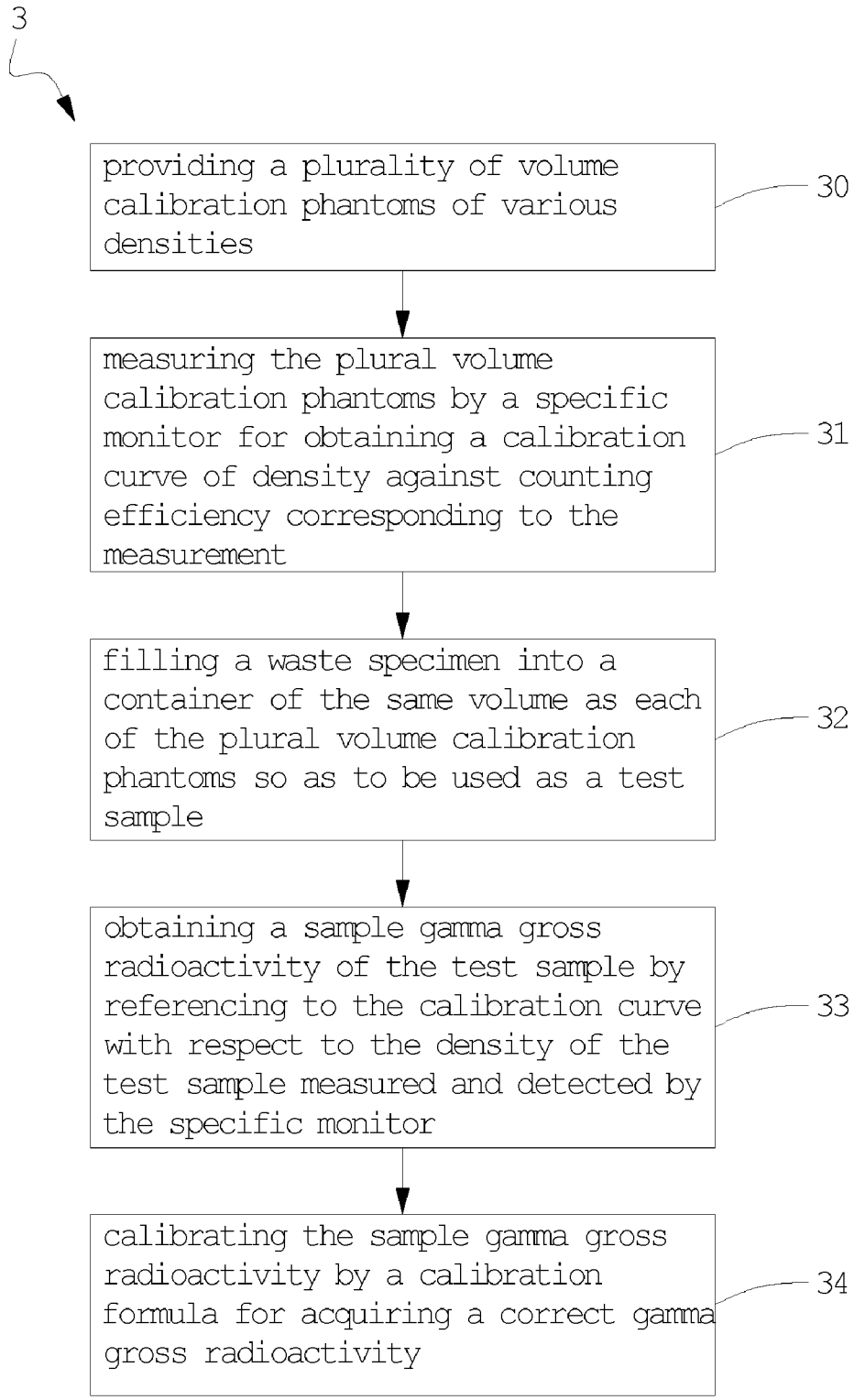
FIG. 4 shows the steps of a calibration method of the invention.

Please refer to FIG. 4, which shows the steps of a calibration method of the invention. The steps of the calibration method are listed and classified into four categories as following:

(1) Density and Count Efficiency Calibration:

In this category, a plurality of multi-radionuclides phantoms of various densities are provided, which is referred as step 30. Thereafter, the plural calibration phantoms are measured by a specific monitor for obtaining a calibration curve of density against counting efficiency correspondingly, referring as step 31.

(2) Photonic Energy Dependency

Figure 7:
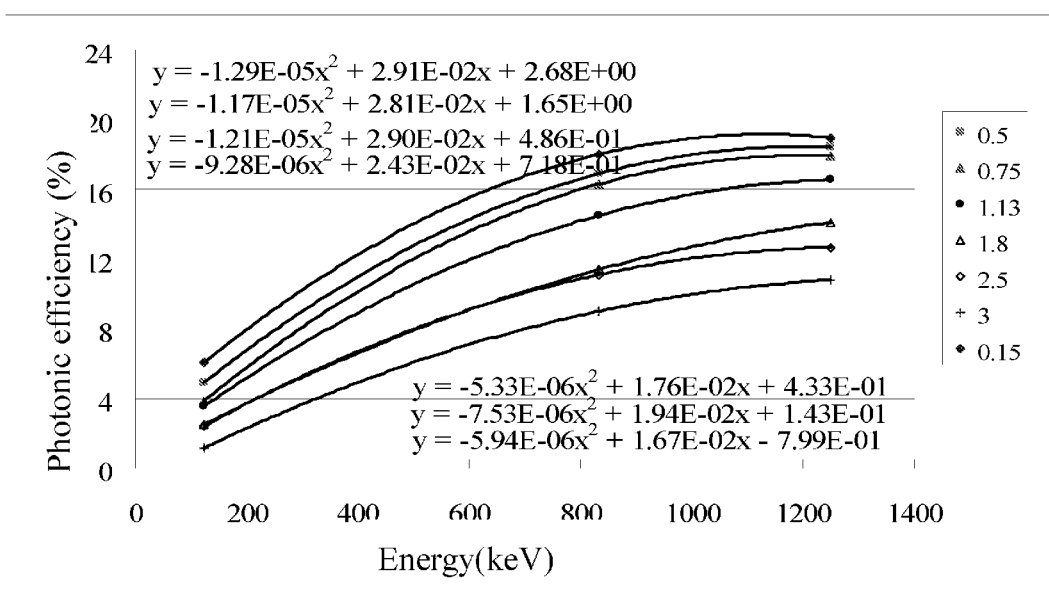
FIG. 7 shows the variations of photonic efficiency with respect to of calibration phantoms of different densities.

In order to evaluate the ratio difference of various gamma energy with respect to that of $^{137}$Cs, large-area gamma radioactive sources of $^{57}$Co of 122 keV and 136 keV, $^{54}$Mn of 834 keV, $^{60}$Co of 1173 keV and 1332 keV, $^{137}$Cs of 662 keV, are placed respectively at the geometrical center of a waste curie monitor for measuring, and thus the radionuclide counting efficiency of gamma nuclides $^{57}$Co, $^{54}$Mn, $^{60}$Co, $^{137}$Cs, obtained from the measurement, are divided respectively by the energy branching ratios corresponding thereto, which are $^{57}$Co: 96%, $^{54}$Mn: 100%, $^{60}$Co: 200%, $^{137}$Cs: 85%, by which a diagram regarding to the photonic efficiency and energy of radionuclides $^{57}$Co, $^{54}$Mn, $^{60}$Co, $^{137}$Cs of various densities can be charted as seen in FIG. 7 that the photonic efficiency is increasing with the increase of the energy. At high energy level, the variation of density will have more influence upon the photonic efficiency, and at low energy, the influence is less. Moreover, the photonic efficiency ratio of $^{57}$Co, $^{54}$Mn, $^{60}$Co with respect to $^{137}$Cs is illustrated in Table 1 as following:

TABLE 1 photonic efficiency ratio of waste curie monitor

| density (g/cm³) | $^{57}$Co/$^{137}$Cs | $^{54}$Mn/$^{137}$Cs | $^{60}$Co/$^{137}$Cs |
|---|---|---|---|
| 0.15 | 0.40 | 1.25 | 1.49 |
| 0.5 | 0.32 | 1.18 | 1.44 |
| 0.75 | 0.26 | 1.13 | 1.41 |
| 1.13 | 0.23 | 1.01 | 1.30 |
| 1.8 | 0.17 | 0.79 | 1.11 |
| 2.5 | 0.16 | 0.77 | 0.99 |
| 3.0 | 0.08 | 0.63 | 0.85 |

(3) Waste Sample Measurement

In this category, a step 32 is first being performed, in which a waste specimen is filled into a container of the same volume as each of the plural volume calibration phantoms so as to be used as a test sample, and then the process proceeds to step 33. At step 33, the weight of the test sample is measured by the monitor for obtaining the density of the same, by which a sample gamma gross radioactivity of the test sample can be obtained by referencing to the calibration curve with respect to the density of the test sample, and then the process proceeds to step 34. At step 34, the sample gamma gross radioactivity is calibrated by an energy dependency factor and a formula of multi-radionuclides calculation for acquiring a correct gamma gross radioactivity.

(4) In order to match the limit of radionuclide radioactivity, it is required for a waste curie monitor to have a correct method for calculating gross gamma radioactivity. Moreover, when a waste sample is verified as a multi-radionuclide waste sample, primarily comprising $^{54}$Mn, $^{60}$Co, $^{137}$Cs, it is required that the deviation of correctness for the radioactivity analysis of each radionuclide to be maintained within a specific tolerance.

(4-1) Minimum Detectable Activity (MDA)

The formula for calculating minimum detectable activity (MDA), defined by US Nuclear Regulatory Commission (USNRC), NUREG-1507(1998), is as following:

$$MDA = 3 + 4.65 \frac{\sqrt{C_{BG}}}{\varepsilon \times t}$$

wherein 3+4.65 is defined as the limit of detector with 95% reliability $C_{BG}$ is defined as counts per second (cps)

Figure 5:
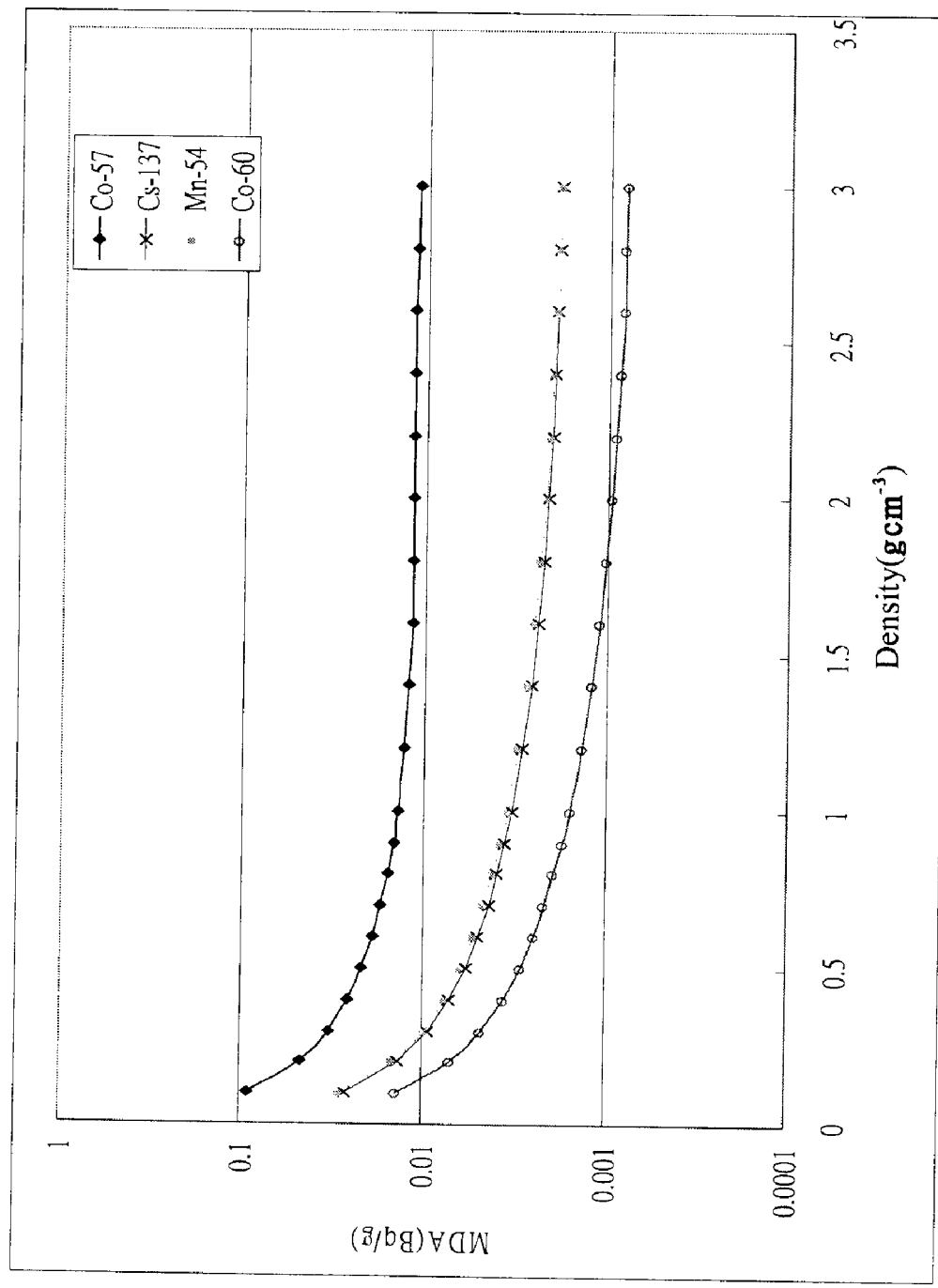
FIG. 5 shows the minimum detectable activities (MDAs) of radionuclides of different densities according to the present invention.

$\varepsilon$ is defined as radionuclide counting efficiency t is defined as counting time (sec)

when the average background counting is 1500, the MDAs of $^{57}$Co, $^{54}$Mn, $^{60}$Co, $^{137}$Cs of various average densities, detected and measured by a Eberline WCM-10PC within two-minute interval, are illustrated in Table 2 and FIG. 5. It is noted that the MDAs of $^{60}$Co and $^{137}$Cs at every average density are coincidence, that is, when the average density is within the range between 1 gcm$^{-3}$ and 2 gcm$^{-3}$, the MDAs of $^{60}$Co and $^{137}$Cs are at their minimum; and when the average density is smaller than 1 gcm$^{-3}$ or larger than 2 gcm$^{-3}$, the MDAs of $^{60}$Co and $^{137}$Cs are respectively 0.003 Bq/g and 0.010 Bq/g, which are about twice the MDAs of $^{60}$Co and $^{137}$Cs when their average density is between 1 gcm$^{-3}$ and 2 gcm$^{-3}$. As the variation of weight is linear and the variation of geometrical center efficiency of radionuclide is an index trend, when the weight is too light or too heavy, the variation of efficiency will be larger than that of weight. Therefore, the MDAs of $^{60}$Co are smaller than those of $^{137}$Cs when the two are at the same average density.

Figure 6:
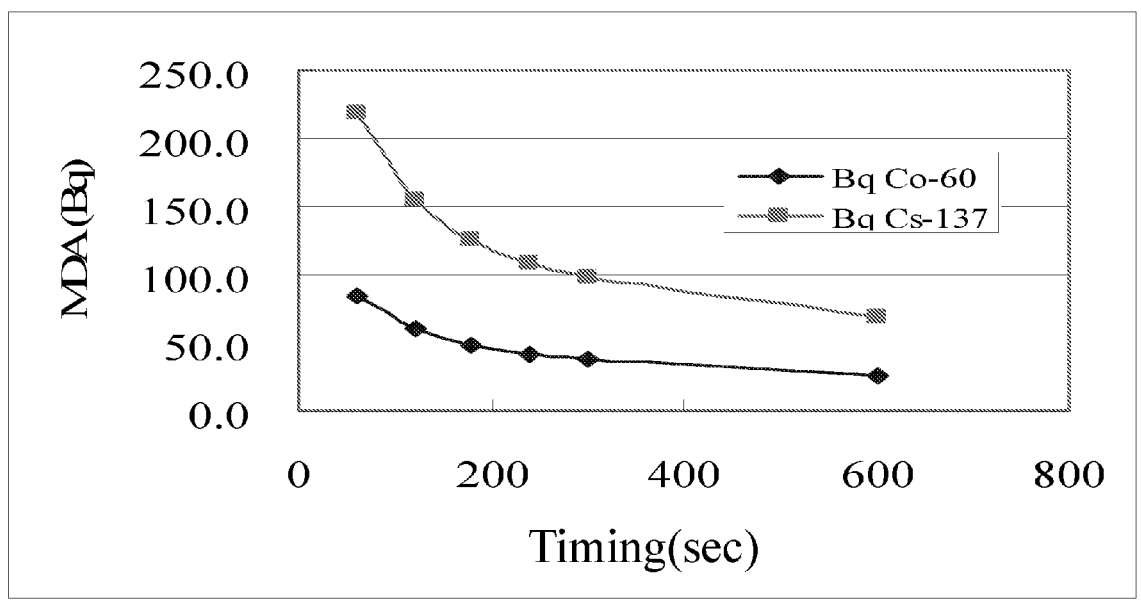
FIG. 6 shows the relationship between counting time and MDAs according to the present invention.

The largest MDAs of $^{54}$Mn, $^{60}$Co, $^{137}$Cs are respectively 0.006 Bq/g, 0.001 Bq/g and 0.010 Bq/g. As the energy of $^{54}$Mn is similar to that of $^{137}$Cs, the MDAs of the two are similar no matter they are contained in cloth, water, iron tube or steel bar. In addition, the aforesaid MDAs of $^{54}$Mn, $^{60}$Co, $^{137}$Cs all match the release limit defined by authority, that is, they should be 10 times lower than the radionuclide release limit defined by IAEA, e.q. $^{54}$Mn, $^{60}$Co, $^{137}$Cs are all defined to be 0.1 Bq/g. In addition, according to the operation manual of the waste curie monitor 3300-200 by Antech company, the MDAs of $^{60}$Co and $^{137}$Cs at two-minute interval are respectively 0.006 Bq/g and 0.015 Bq/g, which are similar to those detected by the monitor used in the present invention. Moreover, by observing the relationship of MDAs, detected by plastic scintillation detectors, and time, the result of the MDA variations of $^{60}$Co and $^{137}$Cs are shown in FIG. 6 as the counting times are set to be 1 min, 2 min, 5 min, 8 min and 10 min. As the counting time is extended from 1 min to 5 min, the MDAs of $^{60}$Co and $^{137}$Cs are lowered respectively by 1.9 times and 2 times. As the counting time is extended from 1 min to 10 min, the MDAs of $^{60}$Co and $^{137}$Cs are lowered respectively by 205 times and 2.7 times. As the counting time is extended from 8 min to 10 min, the MDAs of $^{60}$Co and $^{137}$Cs are lowered respectively by 9% and 15%, which is not significant.

TABLE 2

MDA of waste curie minotor (Bq/g)

| density (g/cm³) | $^{57}$Co | $^{54}$Mn | $^{137}$Cs | $^{60}$Co |
|---|---|---|---|---|
| 0.15 | 0.059 | 0.018 | 0.019 | 0.0095 |
| 0.5 | 0.021 | 0.0058 | 0.0061 | 0.0029 |
| 0.75 | 0.018 | 0.004 | 0.0042 | 0.002 |
| 1.13 | 0.013 | 0.003 | 0.0032 | 0.0014 |
| 1.8 | 0.0084 | 0.0017 | 0.0018 | 0.00075 |
| 2.5 | 0.0088 | 0.0018 | 0.0018 | 0.00083 |
| 3.0 | 0.015 | 0.0019 | 0.002 | 0.0008 |

(4-2) Calculation Formula

Total count: $M = A_i \epsilon_i p_i \Sigma(1 + R_x E_x)$ wherein $A_i$ is the radioactivity of $^{137}$Cs (Bq/g)
$\epsilon_i$ is the photonic efficiency of $^{137}$Cs at 662 keV
$p_i$ is the energy branching ratios of $^{137}$Cs at 662 keV
$R_x$ is the specific activity of each radionuclides against $^{137}$Cs
$E_x$ is the detection efficiency of each radionuclides against $^{137}$Cs radioactivity ratio: $R_x = A_x/A_i$ (a)

wherein $A_x$ is the radioactivity of a radionuclide (HPGe analysis)

ratio of detection efficiency: $E_x = \Sigma \epsilon_x p_x / \epsilon_i p_i$ (b)

wherein $\epsilon_x$ is a detection efficiency of a radionuclides (%)
$p_x$ is anenergy branching ratio of a radionuclide (%)

gross gamma radioactivity: $A_t = M/E_i$ (c)

wherein the detection efficiency of $^{137}$Cs is $E_i = \epsilon_i p_i$ index radionuclide radioactivity: $A_i = A_t/\Sigma(1 + R_x E_x)$ (d)

any radionuclide radioactivity: $A_x = A_i \times R_x$ (e)
release limit:

$$\sum_x A_x/A_{x,0} \le 1$$

wherein $A_{x,0}$ is the radioactivity limit of a radionuclide (4-3) Multi-nuclide Analysis The standard total radioactivity of the seven uniform radionuclides placed inside the calibration phantom, i.e. $^{137}$Cs (72105 Bq), $^{54}$Mn (45309 Bq), $^{60}$Co (86045 Bq) and $^{57}$Co (42777 Bq), is 246239 Bq. The radioactivity ratio $^{57}$Co: $^{54}$Mn: $^{60}$Co: $^{137}$Cs is 0.593: 0.628: 1.19: 1. Thus, the total gross radioactivity, using a sample of $^{137}$Cs at 1.1 gcm$^{-3}$, 1.8 gcm$^{-3}$, and 2.5 gcm$^{-3}$, is shown in Table 3. After the radioactivity of the aforesaid four radionuclides are calibrated by the foregoing formulas, the deviations of correctness form the standard total radioactivity are respectively 1.82%, 2.59% and 1.74%.

(4-3-1) $^{137}$Cs efficiency of 1.1 gcm$^{-3}$ phantom as the index nuclide radioactivity $A_i$ is $^{137}$Cs, the gross radioactivity $A_t$=321197 Bq, and the $E_x$ of $^{57}$Co, $^{54}$Mn, $^{60}$Co with respect to $^{137}$Cs are 0.23, 1.01, and 1.30.
Thus, $$A_i = A_t / \sum (1 + R_x E_x)$$
$$= 321197 / [1 + (0.593 \times 0.23) + (0.628 \times 1.01) + (1.19 \times 1.30)]$$
$$= 73500 \ Bq$$

$A_x = A_i \times R_x$, therefore, $^{57}$Co=$A_i \times 0.593$=43586 Bq $^{54}$Mn=$A_i \times 0.628$=46158 Bq $^{60}$Co=$A_i \times 1.19$=87465 Bq Hence, the calibrated gross gamma radioactivity $A_t$=250709 Bq
the standard gross gamma radioactivity is 246239 Bq
the deviation of correctness is 3.36%

(4-3-2) $^{137}$Cs efficiency of 1.8 gcm$^{-3}$ phantom
as the index nuclide radioactivity $A_i$ is $^{137}$Cs, the gross radioactivity $A_t$=327780 Bq, and the $E_x$ of $^{57}$Co, $^{54}$Mn, $^{60}$Co with respect to $^{137}$Cs are 0.17, 1.79, and 1.11.
Thus $$A_i = A_t / \sum (1 + R_x E_x)$$
$$= 327780 / [1 + (0.593 \times 0.17) + (0.628 \times 0.79) + (1.19 \times 1.11)]$$
$$= 74058 \ Bq$$

$A_x = A_i \times R_x$, therefore, $^{57}$Co=$A_i \times 0.593$=43916 Bq $^{54}$Mn=$A_i \times 0.628$=46508 Bq $^{60}$Co=$A_i \times 1.19$=88129 Bq Hence, the calibrated gross gamma radioactivity $A_t$=252611 Bq
the standard gross gamma radioactivity is 246239 Bq
the deviation of correctness is 2.59%

(4-3-3) $^{137}$Cs efficiency of 2.5 gcm$^{-3}$ phantom
as the index nuclide radioactivity $A_i$ is $^{137}$Cs, the gross radioactivity $A_t$=325651 Bq, and the $E_x$ of $^{57}$Co, $^{54}$Mn, $^{60}$Co with respect to $^{137}$Cs are 0.16, 0.77, and 0.99.
Thus, $$A_i = A_t / \sum (1 + R_x E_x)$$
$$= 325651 / [1 + (0.593 \times 0.16) + (0.628 \times 0.77) + (1.19 \times 0.99)]$$
$$= 185345 \ Bq$$

$A_x = A_i \times R_x$, therefore, $^{57}$Co=$A_i \times 0.593$=43552 Bq $^{54}$Mn=$A_i \times 0.628$=46123 Bq $^{60}$Co=$A_i \times 1.19$=87398 Bq Hence, the calibrated gross gamma radioactivity $A_t$=250517 Bq
the standard gross gamma radioactivity is 246239 Bq
the deviation of correctness is 1.74%

TABLE 3 nuclide parameters for calibration phantoms of various densities

| parameter | gcm$^{-3}$ | $^{57}$Co | $^{54}$Mn | $^{60}$Co | $^{137}$Cs |
|---|---|---|---|---|---|
| $R_x$ | | 0.593 | 0.628 | 1.19 | 1 |
| $p_x$ | | 96% | 100% | 200% | 85% |
| $\epsilon_x$ | 1.1 | 3.5% | 14.5% | 16.6% | 17.7% |
| $\epsilon_x$ | 1.8 | 2.5% | 11.4% | 14.1% | 14.5% |
| $\epsilon_x$ | 2.5 | 2.4% | 11.1% | 12.7% | 13.2% |

To sum up, the volume calibration phantom and calibration method thereof disclosed in the present invention have the following advantages:
(1) The MDAs of $^{57}$Co, $^{54}$Mn, $^{60}$Co are 5 times lower than the release standard specified by authority, that the volume calibration phantom is suitable for measuring a box of uniform nuclear waste.
(2) As the waste is a multi-nuclide waste, the gross gamma radioactivity is calibrated with respect to parameters, such as $A_i$, $\epsilon_i$, $p_i$, $R_x$, $E_x$, so that it is deviated from the standard radioactivity no more than 5%.
(3) The radioactivity uniformity of a multi-density volume calibration phantom composed of four uniform radionuclides is smaller than 7.9%.
(4) The range of the density and energy level of an so-established volume calibration phantom is comparatively wide, so that the accuracy of measurement is enhanced.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A volume calibration phantom, being disposed inside a monitor having a plurality of radiation detectors received inside an accommodation space formed inside the monitor, the volume calibration phantom comprising: a container; a plurality of plates, stacking up inside the container; and at least one slab of radioactive source, each of which is disposed between the adjacent plates and comprises a plurality of radionuclides.

2. The volume calibration phantom of claim 1, wherein each plate is made of a metal.

3. The volume calibration phantom of claim 2, wherein the metal is iron.

4. The volume calibration phantom of claim 1, wherein each plate is made of a non-metal material.

5. The volume calibration phantom of claim 4, wherein the non-metal material is a material selected from the group consisting of paper, wood, gypsum, acrylic resin, rubber and glass.

6. The volume calibration phantom of claim 1, wherein any one of the plural radionuclides is a gamma radioactive source.

7. The volume calibration phantom of claim 6, wherein the gamma radioactive source is a radionuclide selected from the group consisting of $^{57}$Co, $^{54}$Mn, $^{60}$Co, $^{137}$Cs and the combination thereof.

8. The volume calibration phantom of claim 1, wherein any one of the plural radionuclides is a radioactive source of circular shape.

9. The volume calibration phantom of claim 8, wherein the diameter of the circular-shaped radioactive source is smaller than 5 cm.

10. The volume calibration phantom of claim 1, wherein each slab of radioactive source is further comprised of:
a bottom laminating layer;
a leakage-prevention filter layer, formed on the bottom laminating layer while having the plural radionuclides to be formed thereon; and
a top laminating layer, formed on top of the leakage-prevention filter layer as the protection of the plural radionuclides.

11. A calibration method, comprising steps of:
providing a plurality of volume calibration phantoms of various densities;
measuring the plural volume calibration phantoms by a specific monitor for obtaining a calibration curve of density against counting efficiency corresponding to the measurement;
filling a waste specimen into a container of the same volume as each of the plural volume calibration phantoms so as to be used as a test sample;
obtaining a sample gamma gross radioactivity of the test sample by referencing to the calibration curve with respect to the density of the test sample measured and detected by the specific monitor;
calibrating the sample gamma gross radioactivity by a calibration formula for acquiring a correct gamma gross radioactivity.

12. The calibration method of claim 11, wherein each of the plural volume calibration phantoms is capable of receiving a substance selecting from a group consisting of a metallic material and a non-metallic material.

13. The calibration method of claim 12, wherein the metallic material is an iron plate.

14. The calibration method of claim 12, wherein the non-metal material is a material selected from the group consisting of paper, wood, gypsum, acrylic resin, rubber and glass.

15. The calibration method of claim 12, wherein the radioactive source of each volume calibration phantom is a gamma radioactive source.

16. The calibration method of claim 15, wherein the gamma radioactive source is a radionuclide selected from the group consisting of $^{57}$Co, $^{54}$Mn, $^{60}$Co, $^{137}$Cs and the combination thereof.

17. The calibration method of claim 11, wherein the sample gamma gross radioactivity is calibrated with respect to an energy dependency factor and a formula of multi-radionuclides calculation.

* * * * *